United States Patent
Tazartes et al.

(10) Patent No.: US 6,538,745 B1
(45) Date of Patent: Mar. 25, 2003

(54) SHOCK-TOLERANT MULTIOSCILLATOR RING LASER GYRO

(75) Inventors: Daniel A. Tazartes, West Hills, CA (US); John G. Mark, Pasadena, CA (US); Brian T. Lottman, Moorpark, CA (US); Shaw W. Fann, Woodland Hills, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/499,910

(22) Filed: Feb. 8, 2000

(51) Int. Cl.$^7$ .............................................. G01C 19/66
(52) U.S. Cl. ...................................................... 356/467
(58) Field of Search ................................. 356/467, 459

(56) References Cited

U.S. PATENT DOCUMENTS 4,960,331 A * 10/1990 Goldman et al. ............ 356/467
5,485,273 A * 1/1996 Mark et al. .................. 356/467

* cited by examiner

Primary Examiner—Samuel A. Turner
(74) Attorney, Agent, or Firm—Robert E. Malm

(57) ABSTRACT

The invention is a method and apparatus for processing signals with frequencies $f_L$ and $f_R$ from a multioscillator ring laser gyro, the method being repeated at regular time intervals. The difference $f_{\Delta\theta}$, of $f_L$ and $f_R$ is a measure of the angular rotation rate of the ring laser gyro and the sum $f_F$ of $f_L$ and $f_R$ divided by 2 is the Faraday bias frequency. The first step of the method comprises determining two or more of the values $M_{LP}$, $M_{RP}$, $M_{FP}$, and $M_{\Delta\theta P}$ of a set of functions $M_L(f_L)$, $M_R(f_R)$, $M_F(f_F)$, and $M_{\Delta\theta}(f_{\Delta\theta})$. The second step comprises storing two or more processed values $M_{LS}$, $M_{RS}$, $M_{FS}$, and $M^{\Delta\theta S}$ of the functions $M_L(f_L)$, $M_R(f_R)$, $M_F(f_F)$, and $M_{\Delta\theta}(f_{\Delta\theta})$ if the corresponding values of $M_{LP}$, $M_{RP}$, $M_{FP}$, and $M_{\Delta\theta P}$ are valid. A processed value is derived from the value for the present time interval and zero or more processed values for prior time intervals. The third step comprises determining $f_{\Delta\theta P}$ or a function thereof from zero or more valid function values obtained as a result of executing the first step during the current time interval, zero or more processed values obtained as a result of executing the second step during a prior time interval, and zero or more extrapolated values obtained by extrapolating the processed values obtained as a result of executing the second step during a prior time interval to the present time interval.

14 Claims, 3 Drawing Sheets

PRIOR ART

SHOCK-TOLERANT MULTIOSCILLATOR RING LASER GYRO

CROSS-REFERENCE TO RELATED APPLICATIONS (Not applicable)

STATEMENT REGARDING FEDERALLY SPONSORED RESEARCH AND DEVELOPMENT (Not applicable)

BACKGROUND OF THE INVENTION

This invention relates generally to ring laser gyroscopes and more particularly, to multioscillator ring laser gyroscopes.

The ring laser gyroscope (RLG), in its simplest form, is a device comprising an arrangement of mirrors for directing light beams around a closed path through a gain region comprising a lasing gas and an arrangement of electrodes for creating an electrical discharge in the gas and a means for measuring the frequency difference of light beams thereby generated that are propagated around the closed path in opposite directions. The frequency difference of the light beams is a measure of the rotational rate of the RLG apparatus in the plane of the light beams.

A serious problem with this two-frequency RLG is that rotational rates near zero are difficult to measure because of lock-in—the coupling of the counter-propagating light beams as a result of backscatter arising from non-ideal optics. A commercially-successful two-frequency RLG has evolved that circumvents the lock-in problem by separating the frequencies of the counter propagating light beams at zero rotation rate by creating an artificial rotation rate. This artificial rotation rate is brought about by mechanically dithering either the RLG block or a mirror.

The multioscillator RLG represents a more sophisticated approach to solving the lock-in problem by utilizing a purely optical scheme. The scheme is based on the establishment of four resonant modes for the mirror system by placing, for example, a reciprocal polarization rotator and a nonreciprocal polarization rotator in the light path. The lock-in problem is avoided since the four resonant frequencies associated with the four resonant modes are all different, even at a zero rotation rate.

A typical resonant mirror system for a multioscillator RLG is shown in FIG. 1. The four mirrors 1 constrain resonant light beams traveling in opposite directions to light path 3. Circularly-polarized light beams experience reciprocal polarization rotations in reciprocal polarization rotator 5 and non-reciprocal polarization rotations in the Faraday rotator 7. The magnetic field required by the Faraday rotator 7 is provided by permanent magnets 9 with magnetic fields within the magnets having directions as shown by the arrows.

The four resonant modes are CW/LCP, CCW/LCP, CCW/RCP, and CW/RCP, the acronyms CW and CCW standing respectively for clockwise and counterclockwise propagation around the closed path and LCP and RCP standing respectively for left-circularly-polarized light and right-circularly-polarized light. A measure of the rotation rate is obtained by first taking the differences in the frequencies of the right-circularly-polarized light beams and the frequencies of the left-circularly-polarized light beams and then taking the difference in the differences.

A typical example of a reciprocal polarization rotator is a crystalline-quartz element with its optic axis aligned with one portion of the light-beam path. Another way of achieving reciprocal polarization rotation is by using a non-planar light-beam path geometry. The non-reciprocal polarization rotator is typically a Faraday rotator consisting of a thin glass disc in which there is a magnetic field normal to the disc.

Another characteristic of modem RLGs is the use of some means of focusing the light beams so as to minimize the light-beam dimensions transverse to the light path. The usual focusing approach is to utilize a curved mirror for at least one of the mirrors that direct the light beams around the closed path.

The frequency of each of the four resonant laser modes of a multi-oscillator RLG is such that an integral number of wavelengths will fit exactly within the path length of the resonant cavity. A gas mixture, typically comprised of helium and neon, provides gain for the laser beam. In order to ensure proper laser operation, the cavity length must be tuned in such a way that the gas medium will supply sufficient gain at the cavity's resonant frequencies. The methods of ring laser gyro cavity length control are extensively discussed in the literature.

In a multioscillator RLG, four laser modes with widely separated frequencies must be simultaneously sustained within the cavity. A gas mixture providing gain over a wide range of frequencies is used to ensure sufficient gain for all of the modes when the cavity is properly tuned using, for example, the methods disclosed in U.S. Pat. No. 5,208,653.

Cavity length control is usually accomplished by observing the laser intensity and controlling the voltage applied to a piezo-electric transducer which in turn applies force to a mirror diaphragm. This force causes a very slight motion of the mirror face, thereby changing the cavity length. A servo is used to apply the voltage which maximizes the laser intensity.

It has been observed that under high-shock accelerations, the mirror and piezo-electric forcer assembly also move relative to the cavity body due to their inertia and the finite stiffness of the assembly and the servo loop. As a result, the instantaneous cavity length can change substantially during the shock. If the length change is large enough (more than a third or half a laser-mode wavelength of 630 nm). some of the laser modes may drop out due to insufficient gain. This radically affects the operation of the gyro and can cause erroneous angle indications.

This invention takes advantage of certain properties of the multioscillator RLG to provide accurate gyro outputs even under large-shock conditions. As shown in FIG. 2a, the multioscillator RLG operates, in the absence of the reciprocal and nonreciprocal polarization rotators 5 and 7 of FIG. 1, at a single frequency denoted by the intensity arrow near the maximum of the gain curve. The reciprocal polarization rotator 5 splits this single mode into RCP and LCP modes as shown in FIG. 2b. With this mode splitting the multioscillator RLG becomes two circularly-polarized gyros, an RCP gyro and an LCP gyro, co-existing in the same cavity. The resonant frequencies of the two gyros are sufficiently far apart as to be separable, and the gas mixture is chosen to ensure a broad gain curve which allows both modes to lase simultaneously.

The nonreciprocal polarization rotator 7 splits the RCP and LCP modes into CW and CCW modes as shown in FIG. 2c. The mode frequencies in the absence of any angular rotation of the RLG (FIG. 2c and FIG. 2d) are shifted by an angular rotation of the RLG as shown in FIG. 2e. Each of the two gyros is biased by a magneto-optic Faraday crystal in order to provide a separation between the clockwise and counter-clockwise beams and thereby prevent lock-in. The Faraday bias corresponds to a large angular rotation rate (on the order of 1000 degrees/sec) and is sensitive to temperature, magnet field strength, etc.

The two-gyro configuration of the multioscillator RLG permits common mode cancellation of the Faraday bias while providing an accurate angular rotation measurement. This is accomplished in the following way. The output frequencies $f_R$ and $f_L$ of the RCP and LCP gyros is the difference in frequency of the CCW and CW modes. Thus, $$f_R = f_F - \frac{1}{2} f_{\Delta\theta} \quad (1)$$

$$f_L = f_F + \frac{1}{2} f_{\Delta\theta} \quad (2)$$

where $f_F$ is the Faraday bias frequency and $f_{\Delta\theta}$ is proportional to the angular rotation measure of the RLG. For convenience, we will refer to $f_{\Delta\theta}$ as the "angular rotation measure".

In normal operation, the angular rotation measure is determined by taking the difference of the two gyro output frequencies:

$$f_{\Delta\theta} = f_L - f_R \quad (3)$$

The Faraday bias frequency can be determined from any of the equations $$f_F = f_L - \frac{1}{2} f_{\Delta\theta} \quad (4)$$

$$f_F = f_R + \frac{1}{2} f_{\Delta\theta} \quad (5)$$

$$f_F = \frac{1}{2}(f_L + f_R) \quad (6)$$

In the event of a shock or other disturbance which causes a shift in the resonant frequencies with respect to the gain curve, one of the two gyros may operate marginally due to lack of gain to the point where its frequency cannot be detected. In this situation, the calculated $f_{\Delta\theta}$ will be invalid due to an invalid LCP or RCP gyro output. However, it should be noted that at least one of the two gyros will always remain operational as a shift in the gain curve leading to decreased gain in one gyro will actually lead to a gain increase for the other gyro. This invention is a method of using a single gyro within the multioscillator RLG to provide rate information for a short period of time where the second gyro in the multioscillator RLG is inoperative.

BRIEF SUMMARY OF THE INVENTION

The invention is a method and apparatus for processing signals with frequencies $f_L$ and $f_R$ from a multioscillator ring laser gyro, the method being repeated at regular time intervals. The difference $f_{\Delta\theta}$, of $f_L$ and $f_R$ is a measure of the angular rotation rate of the ring laser gyro and the sum $f_F$ of $f_L$ and $f_R$ divided by 2 is the Faraday bias frequency.

The first step of the method comprises determining two or more of the values $M_{LP}$, $M_{RP}$, $M_{FP}$, and $M_{\Delta\theta P}$ of a set of functions $M_L(f_L)$, $M_R(f_R)$, $M_F(f_F)$, and $M_{\Delta\theta}(f_{\Delta\theta})$. The second step comprises storing two or more processed values $M_{LS}$, $M_{RS}$, $M_{FS}$, and $M_{\Delta\theta S}$ of the functions $M_L(f_L)$, $M_R(f_R)$, $M_F(f_F)$, and $M_{\Delta\theta}(f_{\Delta\theta})$ if the corresponding values of $M_{LP}$, $M_{RP}$, $M_{FP}$, and $M_{\Delta\theta P}$ are valid. A processed value is derived from the value for the present time interval and zero or more processed values for prior time intervals.

The third step comprises determining $f_{\Delta\theta P}$ or a function thereof from zero or more valid function values obtained as a result of executing the first step during the current time interval, zero or more processed values obtained as a result of executing the second step during a prior time interval, and zero or more extrapolated values obtained by extrapolating the processed values obtained as a result of executing the second step during a prior time interval to the present time interval.

A function value is concluded to be valid if a rule is satisfied, the rule being selected from the group consisting of (1) the measure of at least one component of the acceleration of the ring laser gyro is less than a specified positive threshold and (2) the measure of at least one component of the acceleration of the ring laser gyro is greater than a specified negative threshold.

An alternative basis for concluding that a function value is valid is if an associated validity index does not exceed a threshold value, a validity index being a measure of (1) the difference in the present function value and the processed function value determined in a prior time period or (2) the difference in the present function value and the processed function value determined in a prior time period and extrapolated to the present time interval.

DETAILED DESCRIPTION OF THE INVENTION

A multioscillator ring laser gyro produces an L signal having a frequency $f_L$ and an R signal having a frequency $f_R$. The difference $f_{\Delta\theta}$, between $f_L$ and $f_R$ is the angular rotation measure of the multioscillator ring laser gyro. The Faraday bias frequency $f_F$ is the sum of $f_L$ and $f_R$ divided by 2.

Figure 1:
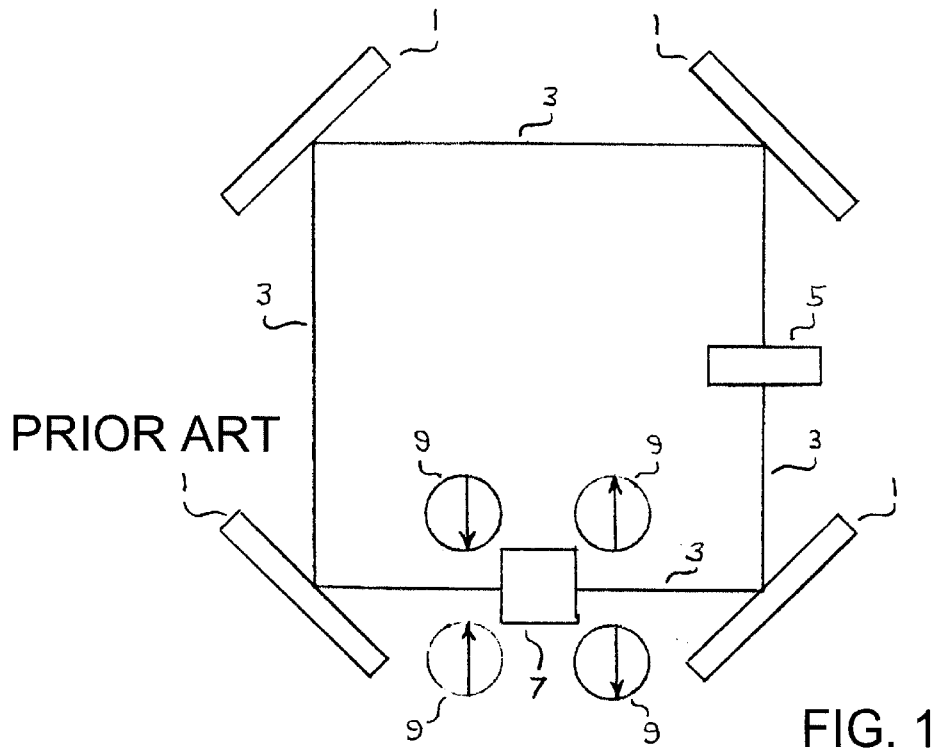
FIG. 1 is a symbolic diagram of a multioscillator ring laser gyro.
Figure 2:
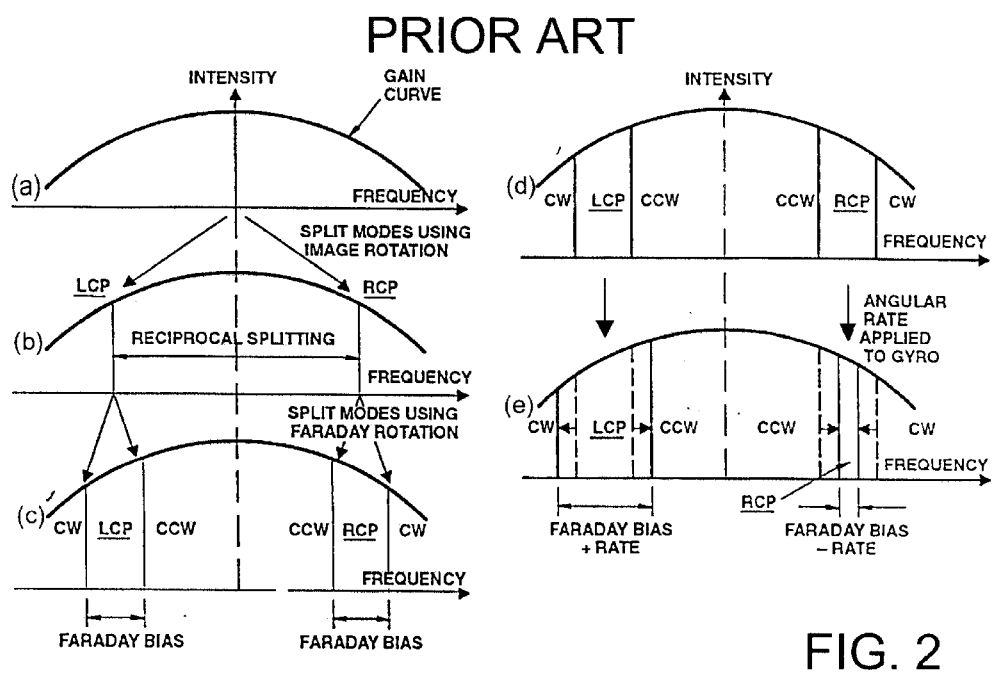
FIG. 2 is an illustration of the mode splitting that occurs in a multioscillator ring laser gyro.
Figure 3:
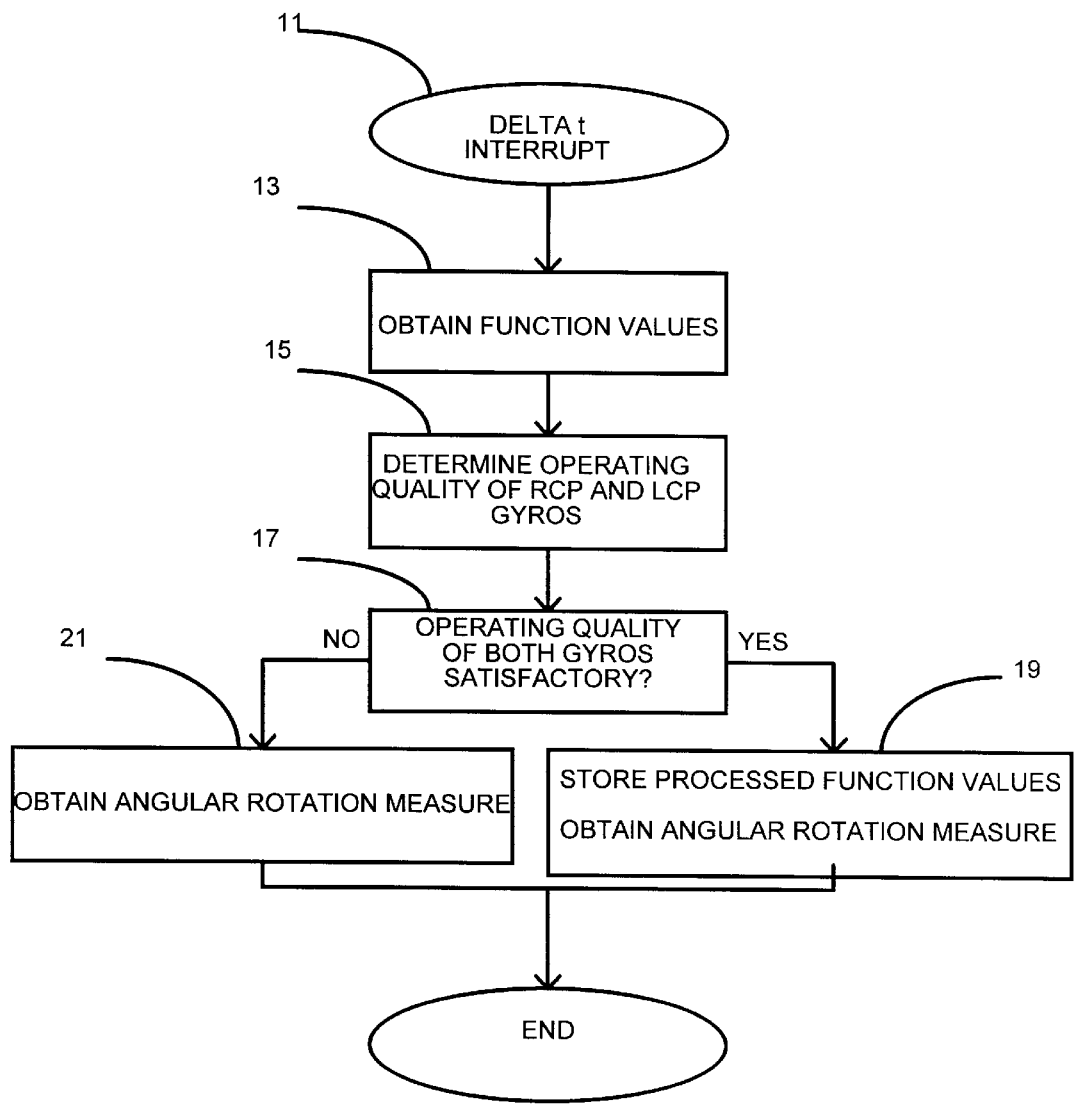
FIG. 3 is a flow diagram for the method of the invention.

The method of the invention is shown in FIG. 3. The first step 11 of the method begins with a $\Delta t$ interrupt which occurs at time intervals $\Delta t$ and is the required or desired time interval between angular rotation measurements.

The next step 13 is to obtain values for two or more functions $M_L$, $M_R$, $M_F$, and $M_{\Delta\theta}$ where $M_L$, $M_R$, $M_F$, and $M_{\Delta\theta}$ are functions respectively of $f_L$, $f_R$, $f_F$, and $f_{\Delta\theta}$. The preferred functions $M_X(f_X)$ are the identities $$M_X(f_X) = f_X \quad (7)$$

A value for $M_X$ can be obtained by counting cycles of the multioscillator ring laser gyro signals occurring in a time interval $\Delta t$. A value for $M_L$ can be obtained by counting the cycles of the L signal. A value for $M_R$ can be obtained by counting the cycles of the R signal. A value for $M_F$ can be obtained by counting the positive transitions of both the L signal and the R signal and then dividing by two. A value for $M_{\Delta\theta}$ can be obtained by counting up the cycles of the L signal and counting down the cycles of the R signal.

Another type of function that could be used is $$M_X(f_X) = \frac{A_X}{f_X} \quad (8)$$

where $A_X$ is a constant. For X=L or X=R, a value of $M_X$ can be obtained by counting the number of cycles of a signal with frequency $A_X$ that occur in a period of the X signal. The count obtained in this way is a measure of the period of the X signal. Values of $M_F$ and $M_{\Delta\theta}$ can be determined from the values of $M_L$ and $M_R$.

Still another type of function that could be used is $$M_X(f_X) = B_X f_X \quad (9)$$

where $B_X$ is a constant. For X=L or X=R, a value of $M_X$ can be obtained by generating from signal X a signal with a frequency increased by a factor $B_X$ and counting the number of cycles of the generated signal in the time interval $\Delta t$. In this way, the frequency of the X signal is determined with greater precision as compared to counting the cycles of the X signal. Values of $M_F$ and $M_{\Delta\theta}$ can be determined from the values of $M_L$ and $M_R$.

The next step 15 is to determine the operating quality of the LCP and RCP RLGs during the present time period. In other words, are the LCP and RCP RLGs functioning properly? One way of doing this is to determine the consistency of the function values $M_{LP}$, $M_{RP}$, $M_{FP}$, and $M_{\Delta\theta P}$ obtained during the present time interval and the function values of $M_{LS}$, $M_{RS}$, $M_{FS}$, and $M_{\Delta\theta S}$ that were obtained in a prior time intervals.

An RLG quality failure is assumed if one or more of the function values for the present time interval are outside the bounds of normal RLG operation. One can recognize a quality failure either by a direct examination of the function values or by an examination of the outputs of one or more sensors that are predictors of RLG quality failures.

An example of a quality-predictor sensor system is one or more accelerometers affixed to the RLG or to the entire RLG assembly to measure the accelerations experienced by the RLG mirrors. If the measured acceleration of a particular mirror is of a sufficient magnitude to disturb the cavity and inhibit the lasing of either the LCP or RCP RLG, it is reasonable to assume that either the LCP or RCP RLG has experienced a quality failure. The direction of the acceleration acting on an RLG mirror is used to determine which RLG is likely to have failed.

Another quality-predictor sensor system is one or more detectors that are capable of detecting electrical interference that may couple into the LCP and RCP RLG signal processing circuits. If the electrical interference is of a nature and of a sufficient magnitude to disturb their operation, it is reasonable to assume that the LCP RLG, the RCP RLG, or both have experienced quality failures.

Still another quality-predictor sensor system is one or more vibration sensors. If the vibrations to which the RLGs are subjected exceed a particular level, it is reasonable to assume that the operation of either or both the RLGs are adversely affected and will experience quality failures.

A direct approach to determining an RLG quality failure is to calculate failure indices $F(M_{LP}, M_{LS})$ and $F(M_{RP}, M_{RS})$ where $M_{LP}$ and $M_{RP}$ correspond to the present time period $\Delta t$ and $M_{LS}$ and $M_{RS}$ correspond to "processed" values determined in a prior time period $\Delta t$ and residing in memory. If $F(M_{LP}, M_{LS})$ exceeds a threshold, the assumption is made that the LCP RLG has experienced a quality failure. If $F(M_{RP}, M_{RS})$ exceeds a threshold, the assumption is made that the RCP RLG has experienced a quality failure. If both $F(M_{LP}, M_{LS})$ and $F(M_{RP}, M_{RS})$ exceed a threshold, the assumption is made that both the LCP RLG and the RCP RLG have experienced a quality failure. Even better failure indices may be obtained by substituting respectively $M_{LE}$ and $M_{RE}$ for $M_{LS}$ and $M_{RS}$ where $M_{LE}$ and $M_{RE}$ are the values $M_{LS}$ and $M_{RS}$ extrapolated to the present time interval.

There are a variety of possible Fs that can be used. For example, $F(M_{XP}, M_{XS})$ could be defined as $$F(M_{XP}, M_{XY}) = \frac{M_{XP}}{M_{XY}} - 1 \quad (10)$$

where X stands for either L or R and Y stands for either S or E. Another possibility is $$F(M_{XP}, M_{XY}) = |M_{XP} - M_{XY}| \quad (11)$$

Ideally, F should be approximately equal to zero when the operating quality of LCP and RCP RLGs are both satisfactorily.

The use of failure indices based on X equaling either L or R are useful in discovering quality failures in $M_{LP}$ and $M_{RP}$. Failure indices based on X equaling either F or $\Delta\theta$ are also useful in certain circumstances. For example, rather than determining $M_{LP}$ and $M_{RP}$, one might choose to determine either $M_{LP}$ or $M_{RP}$ and $M_{\Delta\theta P}$ in which case one might wish to assess the operating quality of $M_{LP}$ and $M_{\Delta\theta P}$ or $M_{RP}$ and $M_{\Delta\theta P}$. One might also choose to determine $M_{FP}$ and $M_{\Delta\theta P}$ in which case one might wish to assess the operating quality of $M_{FP}$ and $M_{\Delta\theta P}$.

In step 17, the decision is made as to whether the operating quality of the LCP RLG and the RCP RLG are both satisfactory. If the answer is yes, the next step 19 consists of storing one or more of the processed values $M_{LS}$, $M_{RS}$, $M_{FS}$, and $M_{\Delta\theta S}$. A processed value $M_{XS}$ determined during the present time interval is a function of the present value $M_{XP}$ and zero or more of the processed values stored during prior time intervals. The processed value $M_{XP}$ is ideally the statistical "best estimate" of the value of $M_X$ based on the present value $M_{XP}$ and the zero or more of the processed values stored during prior time intervals. The process of determining "best estimates" is a standard statistical procedure and is described in most statistics textbooks.

Step 19 concludes with the translation of $M_{\Delta\theta P}$ into $f_{\Delta\theta P}$, the angular rotation measure, and the delivery of this quantity to an external entity.

If the answer to step 17 is no, the next step 21 consists of calculating the value of the angular rotation measure $f_{\Delta\theta}$ utilizing some combination of the present values $M_{LP}$, $M_{RP}$, $M_{FP}$, and $M_{\Delta\theta P}$ and the stored processed values $M_{LS}$, $M_{RS}$, $M_{FS}$, and $M_{\Delta\theta S}$. We illustrate step 21 by assuming that $M_{XP} = f_{XP}$ and $M_{XY} = f_{XS}$ where X takes on the values L and R and Y takes on the values S and E.

If the LCP RLG experiences a quality failure, $f_{RP}$ and $f_{FY}$ are substituted respectively for $f_R$ and $f_F$ in equation (1):

$$f_{\Delta\theta P} = 2(f_{FY} - f_{RP}) \quad (12)$$

If the RCP RLG experiences a quality failure, $f_{LP}$ and $f_{FY}$ are substituted respectively for $f_L$ and $f_F$ in equation (2):

$$f_{\Delta\theta P} = 2(f_{LP} - f_{FY}) \quad (13)$$

Alternative formulations of equations (12) and (13) are obtained by substituting expressions (1) and (2) in the respective equations.

$$f_{\Delta\theta P}=f_{\Delta\theta ?}-2(f_{F?}-f_{FY}) \quad (14)$$

$$f_{\Delta\theta P}=f_{\Delta\theta ?}+2(f_{F?}-f_{FY}) \quad (15)$$

The quantities to which the question marks are attached are assumed to be determined from equations (1) and (2) and are erroneous because of the quality failure of either the LCP or the RCP RLG. Even though $f_{F?}$ and $f_{\Delta\theta ?}$ are erroneous, the errors in the two quantities cancel each other and the correct values are obtained for $f_{\Delta\theta P}$.

If in step 21, $M_{XP}$ does not equal $f_{XP}$ and $M_{XY}$ does not equal $f_{XY}$ where X takes on the values L, R, F, and $\Delta\theta$, the step proceeds in much the same way except that $M_{XP}$ and $M_{XY}$ are first converted to the corresponding $f_{XP}$ and $f_{XY}$ values.

Figure 4:
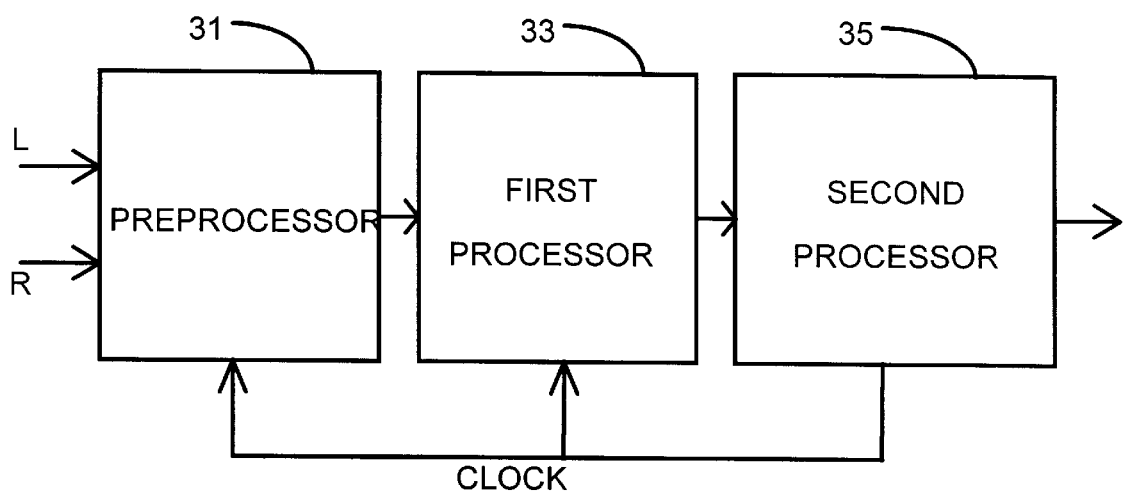
FIG. 4 is a block diagram of apparatus for practicing the method of the invention.

A hardware embodiment of the invention consists of a preprocessor 31, a first processor 33, and a second processor 35 as shown in FIG. 5. The LCP RLG and RCP RLG supply periodic waveforms L and R with frequencies respectively of $f_L$ and $f_R$. The method diagrammed in FIG. 4 is practiced by the hardware units at time intervals $\Delta t$. Step 13 is performed by the preprocessor 31. Step 15 is performed by first processor 33. Steps 17 through 21 are performed by the second processor 35. Timing for all of the units is provided by a clock signal supplied by the second processor 35.

What is claimed is:

1. A method for processing signals with frequencies $f_L$ and $f_R$ from a multioscillator ring laser gyro, the difference $f_{\Delta\theta}$, of $f_L$ and $f_R$ being the angular rotation measure of the ring laser gyro, the sum $f_F$ of $f_L$ and $f_R$ divided by 2 being the Faraday bias frequency, $f_{LP}$, $f_{RP}$, $f_{FP}$, and $f_{\Delta\theta P}$ being the values of $f_L$, $f_R$, $f_F$, and $f_{\Delta\theta}$ for the present time interval, the method comprising the following steps repeated at regular time intervals:

(a) determining two or more of the values $M_{LP}$, $M_{RP}$, $M_{FP}$, and $M_{\Delta\theta P}$ of a set of functions $M_L(f_L)$, $M_R(f_R)$, $M_F(f_F)$, and $M_{\Delta\theta}(f_{\Delta\theta})$, $M_L(f_L)$, $M_R(f_R)$, $M_F(f_F)$, and $M_{\Delta\theta}(f_{\Delta\theta})$ being functions respectively of $f_L$, $f_R$, $f_F$, and $f_{\Delta\theta}$;

(b) storing two or more processed values $M_{LS}$, $M_{RS}$, $M_{FS}$, and $M_{\Delta\theta S}$ of the functions $M_L(f_L)$, $M_R(f_R)$, $M_F(f_F)$, and $M_{\Delta\theta}(f_{\Delta\theta})$ if the corresponding values of $M_{LP}$, $M_{RP}$, $M_{FP}$, and $M_{\Delta\theta P}$ are valid, a processed value being derived from the value for the present time interval and zero or more processed values for prior time intervals.

(c) determining $f_{\Delta\theta P}$ or a function thereof from zero or more valid function values obtained as a result of executing step (a) during the current time interval, zero or more processed values obtained as a result of executing step (b) during a prior time interval, and zero or more extrapolated values obtained by extrapolating the processed values obtained as a result of executing step (b) during a prior time interval to the present time interval.

2. The method of claim 1 wherein step (b) comprises the steps:

(b1) obtaining a measure of at least one component of the acceleration of the ring laser gyro;

(b2) concluding that $M_{XP}$ is valid if a rule is satisfied, the rule being selected from the group consisting of (1) the measure of at least one component of the acceleration is less than a specified positive threshold and (2) the measure of at least one component of the acceleration is greater than a specified negative threshold, X taking on the values of L and R.

3. The method of claim 1 wherein step (b) comprises the steps:

(b1) determining the values of one or more validity indices $F_X(M_{XP}, M_{XS})$, X taking on the values of L, R, F, and $\Delta\theta$, $F_X(M_{XP}, M_{XS})$ being a function of $M_{XP}$ and $M_{XS}$, a validity index being a measure of the likelihood that $M_{XP}$ is invalid;

(b2) concluding that $M_{XP}$ is valid if the associated validity index does not exceed a threshold value.

4. The method of claim 1 wherein step (b) comprises the steps:

(b1) determining the values of one or more validity indices $F_X(M_{XP}, M_{XE})$, X taking on the values of L, R, F, and $\Delta\theta$, $F_X(M_{XP}, M_{XE})$ being a function of $M_{XP}$ and $M_{XE}$, a validity index being a measure of the likelihood that $M_{XP}$ is invalid, $M_{XE}$ being $M_{XS}$ extrapolated to the present time interval;

(b2) concluding that $M_{XP}$ is valid if the associated validity index does not exceed a threshold value.

5. The method of claim 1 wherein it is concluded that $M_{XP}$ is invalid, X being selected from the group consisting of L and R, step (c) comprising the steps:

(c1) determining $f_{\Delta\theta P}$ or a function thereof without using $M_{XP}$.

6. The method of claim 1 wherein it is concluded that $M_{XP}$ is invalid, X being selected from the group consisting of L and R, step (c) comprising the steps:

(c1) determining $M_{\Delta\theta P}$ and $M_{FP}$ assuming $M_{XP}$ is valid;

(c2) correcting the value of $M_{\Delta\theta P}$ using $M_{FP}$ determined in step (c1) and the value of $M_{FS}$;

(c3) determining $f_{\Delta\theta P}$ from the corrected value of $M_{\Delta\theta P}$ from step (c2).

7. The method of claim 1 wherein it is concluded that $M_{XP}$ is invalid, X being selected from the group consisting of L and R, step (c) comprising the steps:

(c1) deetermining $f_{\Delta\theta P}$ and $f_{FP}$ assuming $M_{XP}$ is valid;

(c2) correcting the value of $f_{\Delta\theta P}$ using $f_{FP}$ determined in step (c1) and the value of $f_{FS}$.

8. Apparatus for processing signals with frequencies $f_L$ and $f_R$ from a multioscillator ring laser gyro at regular time intervals, the difference $f_{\Delta\theta}$, of $f_L$ and $f_R$ being the angular rotation measure of the ring laser gyro, the sum $f_F$ of $f_L$ and $f_R$ divided by 2 being the Faraday bias frequency, $f_{LP}$, $f_{RP}$, $f_{FP}$, and $f_{\Delta\theta P}$ being the values of $f_L$, $f_R$, $f_F$, and $f_{\Delta\theta}$ for the present time interval, the apparatus comprising:

a preprocessor for determining two or more of the values $M_{LP}$, $M_{RP}$, $M_{FP}$, and $M_{\Delta\theta P}$ of a set of functions $M_L(f_L)$, $M_R(f_R)$, $M_F(f_F)$, and $M_{\Delta\theta}(f_{\Delta\theta})$, $M_L(f_L)$, $M_R(f_R)$, $M_F(f_F)$, and $M_{\Delta\theta}(f_{\Delta\theta})$ being functions respectively of $f_L$, $f_R$, $f_F$, and $f_{\Delta\theta}$;

a first processor for storing two or more processed values $M_{LS}$, $M_{RS}$, $M_{FS}$, and $M_{\Delta\theta S}$ of the functions $M_L(f_L)$, $M_R(f_R)$, $M_F(f_F)$, and $M_{\Delta\theta}(f_{\Delta\theta})$ if the corresponding values of $M_{LP}$, $M_{RP}$, $M_{FP}$, and $M_{\Delta\theta P}$ are valid, a processed value being derived from the value for the present time interval and zero or more processed values for prior time intervals.

a second processor for determining $f_{\Delta\theta P}$ or a function thereof from zero or more valid function values obtained as a result of executing step (a) during the current time interval, zero or more processed values obtained as a result of executing step (b) during a prior time interval, and zero or more extrapolated values obtained by extrapolating the processed values obtained as a result of executing step (b) during a prior time interval to the present time interval.

9. The apparatus of claim 8 wherein the method practiced by the first processor comprises the steps:

(b1) obtaining a measure of at least one component of the acceleration of the ring laser gyro;

(b2) concluding that $M_{XP}$ is valid if a rule is satisfied, the rule being selected from the group consisting of (1) the measure of at least one component of the acceleration is less than a specified positive threshold and (2) the measure of at least one component of the acceleration is greater than a specified negative threshold, X taking on the values of L and R.

10. The apparatus of claim 8 wherein the method practiced by the first processor comprises the steps:

(b1) determining the values of one or more validity indices $F_X(M_{XP}, M_{XS})$, X taking on the values of L, R, F, and $\Delta\theta$, $F_X(M_{XP}, M_{XS})$ being a function of $M_{XP}$ and $M_{XS}$, a validity index being a measure of the likelihood that $M_{XP}$ is invalid;

(b2) concluding that $M_{XP}$ is valid if the associated validity index does not exceed a threshold value.

11. The apparatus of claim 8 wherein the method practiced by the first processor comprises the steps:

(b1) determining the values of one or more validity indices $F_X(M_{XP}, M_{XE})$, X taking on the values of L, R, F, and $\Delta\theta$, $F_X(M_{XP}, M_{XE})$ being a function of $M_{XP}$ and $M_{XE}$, a validity index being a measure of the likelihood that $M_{XP}$ is invalids $M_{XE}$ being $M_{XS}$ extrapolated to the present time interval;

(b2) concluding that $M_{XE}$ is valid if the associated validity index does not exceed a threshold value.

12. The apparatus of claim 8 wherein it is concluded that $M_{XP}$ is invalid, X being selected from the group consisting of L and R, the method practiced by the second processor comprising the step:

(c1) determining $f_{\Delta\theta P}$ or a function thereof without using $M_{XP}$.

13. The apparatus of claim 8 wherein it is concluded that $M_{XP}$ is invalid, X being selected from the group consisting of L and R, the method practiced by the second processor comprising the steps:

(c1) determining $M_{\Delta\theta P}$ and $M_{FP}$ assuming $M_{XP}$ is valid;

(c2) correcting the value of $M_{\Delta\theta P}$ using $M_{FP}$ determined in step (c1) and the value of $M_{FS}$;

(c3) determining $f_{\Delta\theta P}$ from the corrected value of $M_{\Delta\theta P}$ from step (c2).

14. The apparatus of claim 8 wherein it is concluded that $M_{XP}$ is invalid, X being selected from the group consisting of L and R, the method practiced by the second processor comprising the steps:

(c1) determining $f_{\Delta\theta P}$ and $f_{FP}$ assuming $M_{XP}$ is valid;

(c2) correcting the value of $f_{\Delta\theta P}$ using $f_{FP}$ determined in step (c1) and the value of $f_{FS}$.

* * * * *